United States Patent [19]
DuVal

[11] Patent Number: 5,818,836
[45] Date of Patent: Oct. 6, 1998

[54] METHOD AND APPARATUS FOR ANONYMOUS VOICE COMMUNICATION USING AN ONLINE DATA SERVICE

[76] Inventor: Stephen C. DuVal, 186 Plymouth Dr., Iverness, Ill.

[21] Appl. No.: 512,820

[22] Filed: Aug. 9, 1995

[51] Int. Cl.[6] .......................... H04L 12/28; H04L 12/56; H04M 1/64; H04M 3/42
[52] U.S. Cl. .......................... 370/389; 370/352; 370/392; 379/67; 379/204
[58] Field of Search ...................................... 370/389, 392, 370/352, 485, 458; 379/100, 201, 90, 93, 94, 243, 229, 230, 100.13, 261, 204, 67, 88, 206, 90.01, 93.01

[56] References Cited

U.S. PATENT DOCUMENTS

| | | | |
|---|---|---|---|
| 3,144,518 | 8/1964 | Lummis | 379/204 |
| 4,475,189 | 10/1984 | Herr et al. | 370/261 |
| 4,577,065 | 3/1986 | Frey et al. | 379/204 |
| 4,771,425 | 9/1988 | Baran et al. | 370/458 |
| 4,847,890 | 7/1989 | Solomon et al. | 379/67 |
| 4,878,239 | 10/1989 | Solomon et al. | 379/67 |
| 4,908,850 | 3/1990 | Masson et al. | 379/88 |
| 4,969,184 | 11/1990 | Gordon et al. | 379/100.13 |
| 5,058,152 | 10/1991 | Solomon et al. | 379/67 |
| 5,369,694 | 11/1994 | Bales et al. | 379/206 |
| 5,608,786 | 3/1997 | Gordon | 370/352 |

OTHER PUBLICATIONS

Yang, C., "RFC 1789: INETPhone–Telephone Services and Servers on Internet." Apr. 1995. <http://ds.internic.net/rfc/rfc1789.txt>(12 Feb. 1997).
Casner, S., et al. "RFC 14ZZ: Ingegrated Service in the Internet Architecture". Sep. 1993.
Clark, D., et al. "Supporting Real–Time Applications in an Integrated Services Packet Network–Architecture and Mechanism." ACM COMM'92–Aug. 1992.
Baran, P., "On Distributed Communications Networks." IEEE Transactions on Communications Systems, manuscript received Oct. 1963, Mar. 1964.

*Primary Examiner*—Wellington Chin
*Assistant Examiner*—Melissa Kay Carman
*Attorney, Agent, or Firm*—Blakely, Sokoloff, Taylor & Zafman

[57] ABSTRACT

An anonymous telephone communication system. The system includes an anonymous voice system which can establish an anonymous telephone communication through a circuit switched network (CSN). In operation, two parties place separate telephone calls to the anonymous voice system through the CSN. The parties then enter matchcodes through their telephone keypads. The anonymous voice system compares the matchcodes entered by the parties and connects the telephone calls if the matchcodes match. The system may include an on-line data service that establishes electronic communication between the parties through corresponding data terminals. The data terminals may have resident anonymous voice input commands that can be selected by the parties. The on-line data service transmits a connect command to the anonymous voice system which dials the two parties, or waits for the parties to dial the system, and then connects the parties. The anonymous voice system sends a disconnect command to the on-line data service when the parties hang up. The disconnect command can be used by the online service to bill the parties for using the anonymous voice service. The system also stores a couple record during the first anonymous call recording the matchcode and the telephone numbers of both parties. Subsequently, either party may initiate an anonymous call to the other party without prior coordination.

21 Claims, 10 Drawing Sheets

COUPLE RECORD      80

| MATCH CODE | 87 |
|---|---|
| FIRST PARTY INFO | 84a |
| SECOND PARTY INFO | 84b |
| DATE LAST ACTIVITY | 92 |
| FIRST CALL SWITCH | 88 |
| ON-LINE STATUS | 90 |

FIRST CALL SWITCH: 1 = FIRST CALL, 2 = NOT FIRST CALL

ON-LINE STATUS: 1 = NOT ON-LINE, 2 = ON-LINE

PARTY INFORMATION      84

| TELEPHONE NUMBER | 86 | 0 IF UNUSED |
|---|---|---|
| STATUS | 94 | 0 = INACTIVE, 1 = WAITING, 2 = CONNECTED |
| ACCEPT CALLS | 96 | 0 = DON'T ACCEPT, 1 = ACCEPT |
| FIRST MESSAGE | 98 | 0 IF NO MESSAGE |
| AVS CHANNEL | 100 | 0 IF INACTIVE |
| VP CHANNEL | 102 | |
| ODS ID | 128 | |
| DIAL IN/DIAL OUT | 126 | 1 = DIAL IN, 2 = DIAL OUT |
| AVS ID | 722 | |

MESSAGE RECORD      82

| NEXT MESSAGE | 104 | 0 IF LAST MESSAGE |
|---|---|---|
| MESSAGE | 106 | |

FIG. 5

CONNECT MESSAGE 110

| MESSAGE ID | 114 |
| FIRST CALLER INFO | 116 |
| SECOND CALLER INFO | 118 |
| MATCHCODE | 120 |

CALLER INFO 122

| CALLER IDENTIFIER | 124 |
| DIAL IN/OUT | 126 | 1 = DIAL IN, 2 = DIAL OUT
| ODS ID | 128 |

DISCONNECT MESSAGE 112

| MESSAGE ID | 114 |
| MESSAGE STATUS | 132 | 1 = ERROR, 2 = CALL COMPLETE
| FIRST PARTY COMPLETION INFO | 134 |
| SECOND PARTY COMPLETION INFO | 136 |

COMPLETION INFO 138

| START TIME OF CALL | 140 |
| END TIME OF CALL | 142 |
| CALLER IDENTIFIER | 144 |
| ODS ID | 146 |

FIG. 6

METHOD AND APPARATUS FOR ANONYMOUS VOICE COMMUNICATION USING AN ONLINE DATA SERVICE

BACKGROUND OF THE INVENTION

1. Field of the Invention

The present invention relates to a method and apparatus for establishing anonymous telephone communication.

2. Description of Related Art

Telephone calls are typically established by one party dialing the phone number of a second party. The call is routed by a public switched telephone network (PSTN) to the phone unit of the called party. Generally speaking, the calling party must know the phone number of the called party to establish a call.

To maintain confidentiality, it may desirable to establish a two-party telephone communication without divulging the phone numbers of the parties. For example, two parties may be communicating using an online service such as America Online or Prodigy. The two parties exchange electronic mail by entering messages into their data terminals. The messages are transmitted over a public data network (PDN) to the online service provider. At some point in the communication the parties may want to establish voice communication with the other party without revealing their phone number to the other party. It would be desirable to have a system that can provide such an anonymous telephone communication.

"Chat lines" systems provide a form of anonymous voice communication. One type of prior art chat line randomly connects callers who call into the system. The callers can transfer to a different caller by pressing a key on the telephone handset. In this system the number of people a caller can communicate with is limited to the people who are connected to the system. Further, the caller has no control over who they will be connected to.

Another form of chat line allows a number of people to call a conference bridge. The bridge allows the callers to talk to each other anonymously in a conference call. Two callers may interact with the system to move into a two party communication. In this system the range of potential call mates is limited to callers already on the system. This system does not allow two parties to reestablish anonymous communication. Additionally, the voice communication required to select the other party is expensive relative to data communication.

Another form of chat line allows people to call into a system, record a short greeting, browse the greetings of other callers currently on the system, and request an anonymous connection to the party associated with a greeting. In this case, the range of potential call mates is limited to callers currently on the system and the selection process is cumbersome. Additionally, the system does not allow callers to reestablish anonymous communication, and the voice communication required to select the other party is expensive relative to data communication. It would be desirable to provide an anonymous telephone communication system without limiting the choice of call mates to people who are already on the system. It would also be desirable to have a telephone system which allows callers to reestablish an anonymous voice connection, which reduces the cost of selecting the other party to the call, which provides better mechanisms to search for and select the other party to the call.

Anonymous communication can also be established using a published ad and the ability to "cut through" a call to the advertiser. In this situation, the calling party browses ads (Lonely Hearts) published by other parties, selects an ad, calls the system and enters the number associated with the ad. The system calls the advertiser and asks them if they are willing to accept the call, and if they are willing to accept the call, then the system connects the two parties anonymously.

U.S. Pat. Nos. 4,847,890, 5,058,152 and 5,361,295 issued to Solomon disclose an anonymous telephone communication system. In the Solomon system each subscriber is assigned a personal identification number (PIN) that is stored in a database with the telephone number of the subscriber. The subscriber places a personal advertisement in a printed publication which lists the PIN and a phone number of the system. A reader who wishes to contact the subscriber calls the published phone number of the system and enters the PIN through the telephone keypad. The system correlates the PIN with the subscriber telephone number and connects the caller to the subscriber. In this manner the caller does not know the phone number of the subscriber.

The Solomon system requires a printed publication to advertise the PIN and corresponding phone number. Additionally, instead of specifying in advance which callers will be accepted, the Solomon system requires the advertiser to turn the system on and off. It would be desirable to provide anonymous telephone communication which did not limit the potential called parties to those who had placed an advertisement, which allowed a better mechanism for selecting the other party than browsing ads, which allowed both parties to initiate the communication, and which allowed both parties to identify the parties from which they were willing to accept anonymous calls.

"Voice Personals with cut through" is an implementation of the Solomon patents. In this case the advertisement is a voice recording. Callers to the system are allowed to browse the voice greetings left by advertisers. When the caller finds a greeting they like, the caller requests an anonymous telephone call with the other party using the cut through approach. This approach suffers from the same limitations as indicated above. In addition, sequential browsing of voice recordings is a cumbersome method of selecting the other party and voice communication is expensive relative to data communications.

Prodigy offers a service which allows subscribers to search ads online. However, to contact the advertiser, the subscriber must follow the same procedure used for a newspaper ad ie. dial the system and enter the PIN from the ad. This system is limited to chat mates who place ads and the set up process for the voice call is not integrated with the online data service.

There also exist a phone system to establish conference calls referred to as "MEET ME". The MEET ME service is described in U.S. Pat. No. 4,577,065 issued to Frey, et al., and U.S. Pat. No. 5,369,694 issued to Bales et al. In the MEET ME system, at about the same time, each party dials a telephone number assigned to the service and then enters a code which has been assigned to the conference call. The system connects each caller to a conference system which utilizes a digital bridge to implement the conference call.

A conference bridge is a specialized piece of equipment required for conferencing digital calls. For each caller, it takes the input signal from multiple callers, sums these signals, removes the signal for one caller, and then outputs the signal to that caller. It would be desirable to provide an anonymous two party telephone communication which used the MEET ME approach to set up a two party call and which did not require a conference bridge for communication.

Packet switched networks can transmit digitally encoded voice as well as data. To communicate by voice over a package switched network, both parties must have a microphone and speakers attached to their computer, the computers must have sufficient processing power to decompress the digital signal in real time, and both computers must be running software which uses the same protocol to establish communication and to decompress the voice signal. The lack of widespread deployment of compatible hardware and software has limited the use of computer based voice communication systems. In addition, a buffer is used in both computers to eliminate the jitter associated with random delays in the packet switching network. This delay degrades the quality of the communication link. The voice quality is also degraded by the use of compression techniques. It would be desirable to provide an anonymous telephone communication without requiring the use of special equipment, other than a telephone and possibly a computer, and which allowed high quality voice communication.

"Teletalk" from Cinecom is a software package which allows two users of Galacticom's Worldgroup bulletin board system to communicate anonymously. Both parties must be able to record and playback speech on their computer. After one party makes a recording, the resulting file is transferred to the other party through the bulletin board system. The other party's computer receives the file and plays it. This approach provides a high quality voice signal; however, the delay between speaking and hearing for the two parties is very long. In addition the load on the bulletin board system to transfer these large speech files is substantial. It would be desirable to provide anonymous voice communication which overcame these deficiencies.

Cheersoft has advertised a product called "Autopatch", which converts data communication into voice communication. The Cheersoft device is a small 8 port circuit switch into which analog telephone lines are connected on one side and modems are connected on the other side. The modems are connected to a bulletin board system. Initially the device passes signals from the analog telephone line to the modem. At the request of two users who are communicating via the bulletin board, the bulletin board signals the switch which then connects the two analog lines. This provides the parties with an anonymous voice connection. This approach is inefficient because most of the time the switch just passes data packets from the analog line to the modem. The Cheersoft product will not work when either party is connected to the bulletin board over a packet switching network such as X.25 or Internet. It would be desirable to provide an anonymous telephone communication system which could convert a data communication over a packet switched network to a voice communication over a circuit switched network.

SUMMARY OF THE INVENTION

An anonymous telephone communication system. The system includes an anonymous voice system which can establish an anonymous telephone communication through a circuit switched network (CSN). In standalone operation, two parties place separate telephone calls to the anonymous voice system through the CSN. The parties then enter matchcodes through their telephone keypads. The anonymous voice system compares the matchcodes entered by the parties and connects the telephone calls if the matchcodes match.

The system may include an on-line data service that establishes electronic communication between the parties through corresponding data terminals. The data terminals may have resident anonymous voice input commands that can be selected by the parties. The on-line data service transmits a connect command to the anonymous voice system which dials the parties, or waits for the parties to dial the system, and then connects the parties. The anonymous voice system sends a disconnect command to the on-line data service when the parties hang up. The disconnect command can be used by the online service to bill the parties for using the anonymous voice service.

The system also stores a couple record during the first anonymous call recording the matchcode and the telephone numbers of both parties. Subsequently, either party may initiate an anonymous call to the other party without prior coordination. Any method may be used to establish the first anonymous call, including the methods described in the Solomon patents, provided the method for the first call is modified to include the step of storing a couple record.

The anonymous voice system may be implemented as "customer premise equipment" attached to the Public Switched Telephone Network via an access line or it may be implemented as an "adjunct processor" within the Public Switched Telephone Network.

The Anonymous Voice System may be distributed with nodes in the major cities so that at most one long distance call is required when one of the callers is resident in a city with an AVS node.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 5 is a schematic showing different anonymous voice fields;

FIG. 6 is a schematic showing different fields of messages transferred between an anonymous voice system and an on-line data service;

DETAILED DESCRIPTION OF THE INVENTION

Figure 1:
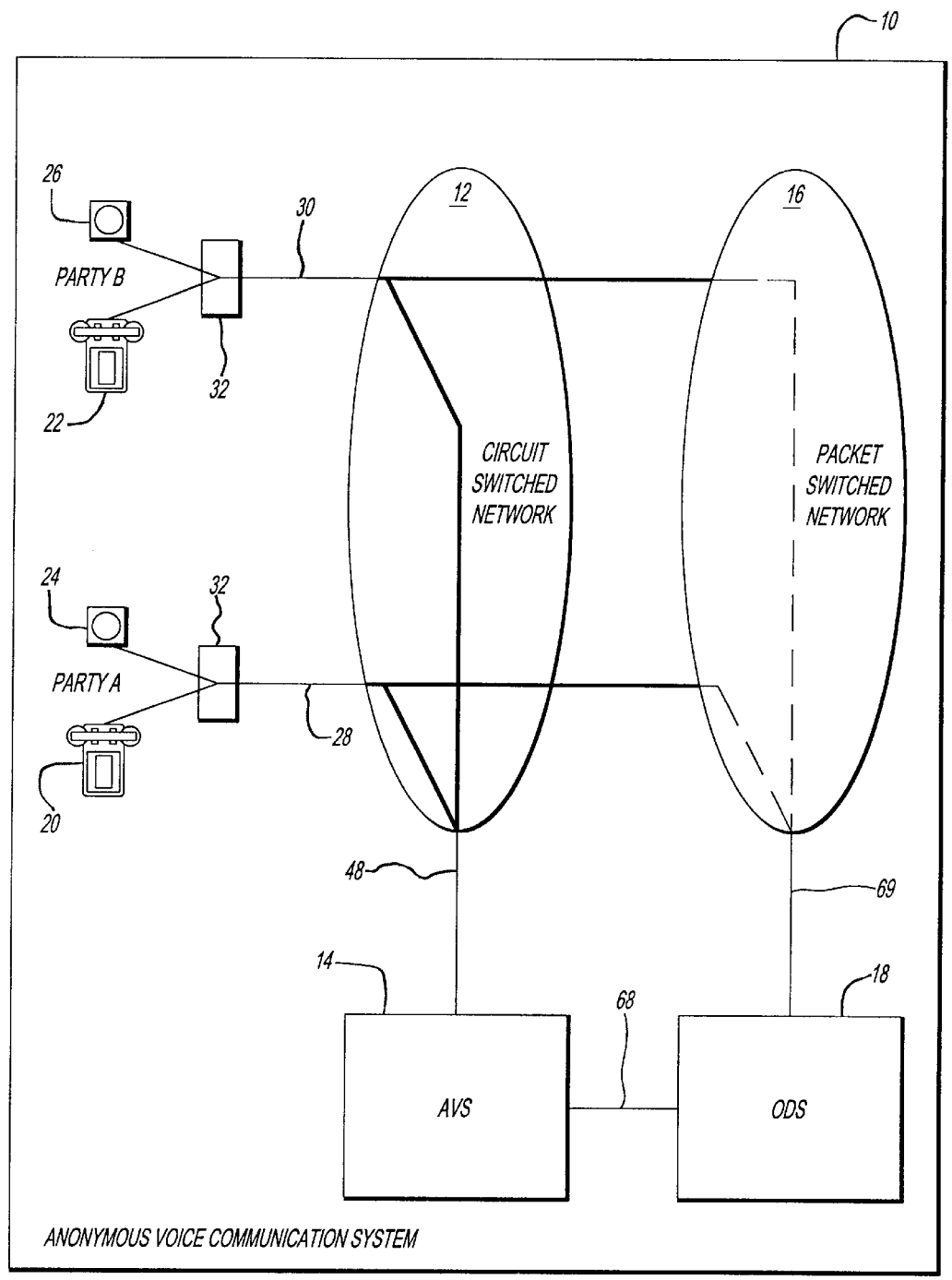
FIG. 1 is a schematic of a system of the present invention.

Referring to the drawings more particularly by reference numbers, FIG. 1 shows an anonymous voice communication system 10 of the present invention. In one embodiment the system 10 uses a circuit switched network (CSN) 12 and an Anonymous Voice System (AVS) 14 to establish anonymous voice communication between party A and party B. In another embodiment the system 10 additionally uses a packet switched network 16 and an on-line data system (ODS) 18 to initiate an anonymous voice communication between party A and party B.

Each party has a telephone station 20, 22 that is connected to the circuit switched network 12. The system 10 utilizes a circuit switched network 12 to establish a voice connection between the telephone stations 20 and 22, and the AVS 14.

In one embodiment the Anonymous Voice System 14 prompts both parties for an input and based upon that input connects the two calls so that party A is communicating anonymously with Party B.

In another embodiment, each party may also have a data terminal 24, 26 which may be connected to the ODS 18 through the circuit switched network 12 and the packet switched network 16. The parties exchange messages through the on-line data system 18 to request an anonymous voice connection. The On-line data system 18 generates a command which prompts the Anonymous Voice System 14 to establish a telephone connection with party A and party B, and then connects the two parties. Although two parties are shown and described, it is to be understood that numerous parties may be connected to the system of the present invention. Additionally, although personal computers 24, 26, a packet switched network 16, and an on-line data system 18 are shown and described, it is to be understood that anonymous voice communication can be established with the present invention without these components. Additionally, although one on-line data system 18 is shown and described, it is to be understood that numerous on-line data systems 18 may be connected to the system of the present invention.

The telephone stations 20, 22 may be ordinary telephones, ISDN telephones, or any device which can terminate an access line, play an audio signal and transmit a received audio signal.

The data terminals 24, 26 may be any personal computer with the ability to process and store data, display information, accept input via keyboard, microphone, or writing tablet, and communicate with other devices via a serial port, modem, or Local Area Network.

The parties can be coupled to the circuit switched network 12 by access lines 28 and 30. The access lines 28, 30 may be ordinary copper lines typically provided by the telephone companies, coaxial lines typically provided by the CATV firms, a wireless connection typically provided by a cellular company, or hybrid fiber coax which is currently being deployed by telephone and CATV firms. When a personal computer 24, 26 is implemented, a connector 32 may couple both the telephone station and the personal computer to the same access line. When the access line is ordinary copper lines, the connector can be a relay switch or an RJ-11 jack with two receptacles. When the access line supports ISDN, the connector would be an NT1 interface with a TA for the telephone. Both the B channel and the D channel of the ISDN access line can be used to connect the personal computer to the packet switched network 16. For coaxial or hybrid fiber coax access lines, the connector 32 would have to include a radio transmitter to place the signal on the coaxial cable.

Figure 2:
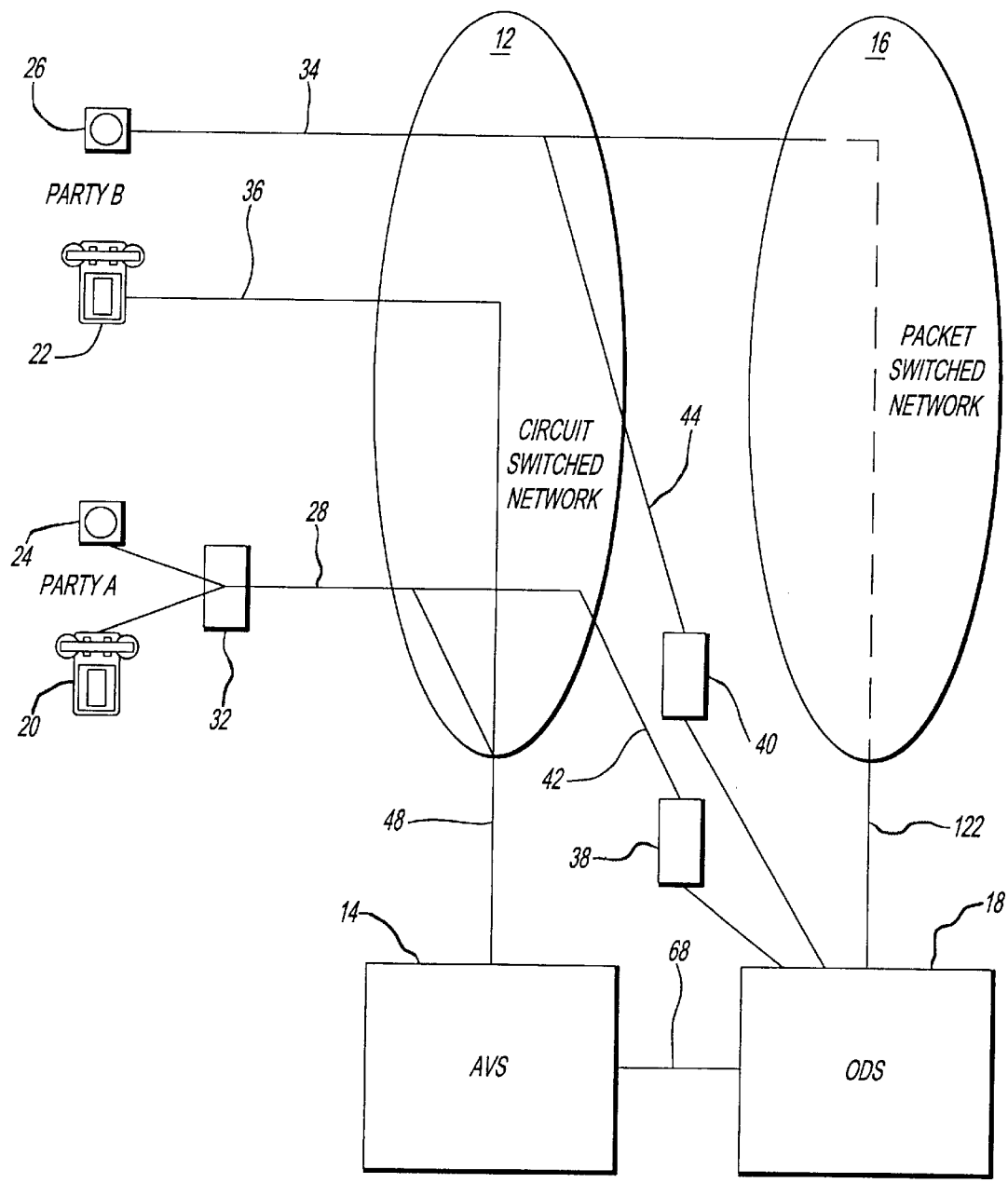
FIG. 2 is a schematic of an alternate embodiment of the system.

FIG. 2 shows alternative ways to connect the telephone stations and personal computers. The computer 26 and telephone station 22 may be connected to the circuit switched network by separate access lines 34 and 36. If two access lines 34, 36 are used, then a connector 32 is not required. Additionally, the computers may be connected to the ODS 18 by modems 38 and 40 through access lines 42 and 44 that are coupled to the CSN 12. If both personal computers 24, 26 are connected to the On-line data system 18 via modems 38, 40 and access lines 42, 44 then the packet switched network 16 is not required even when the ODS is used to initiate the anonymous voice call.

The circuit switched network 12 may be any network capable of connection oriented isochroneous communication such as the existing public switched telephone network, or an ATM network using ATM Adaptation Layer type 1 to provide a constant bit rate service.

The packet switched network 16 may be any network capable of switching packets such as public data networks including Sprintnet with X.25 or frame relay, the Internet using TCP/IP, an SMDS based network, or an ATM network using ATM Adaptation Layer type 2, 3, 4, or 5 to provide variable bit rate services. It may be as simple as a modem bank connected to a statistical multiplexor which is connected to the ODS via a dedicated circuit or even point to point dedicated circuits with modems on each end.

The Anonymous Voice System 14 is a processor-controlled, software-driven interactive voice response system with switching, access line termination, call supervision and progress analysis, audio playback and record, tone detection and generation, storage devices, and optionally voice recognition. The operation of the anonymous Voice System 14 is controlled by system software capable of executing transaction scripts which include commands [i]) to answer incoming calls and dial outgoing calls, ii) to prompt callers to enter touch-tone or spoken information, iii) to gather such information, iv) to connect calls to each other, v) to monitor calls for disconnect, vi) to do call progress analysis on outgoing calls.

Figure 3:
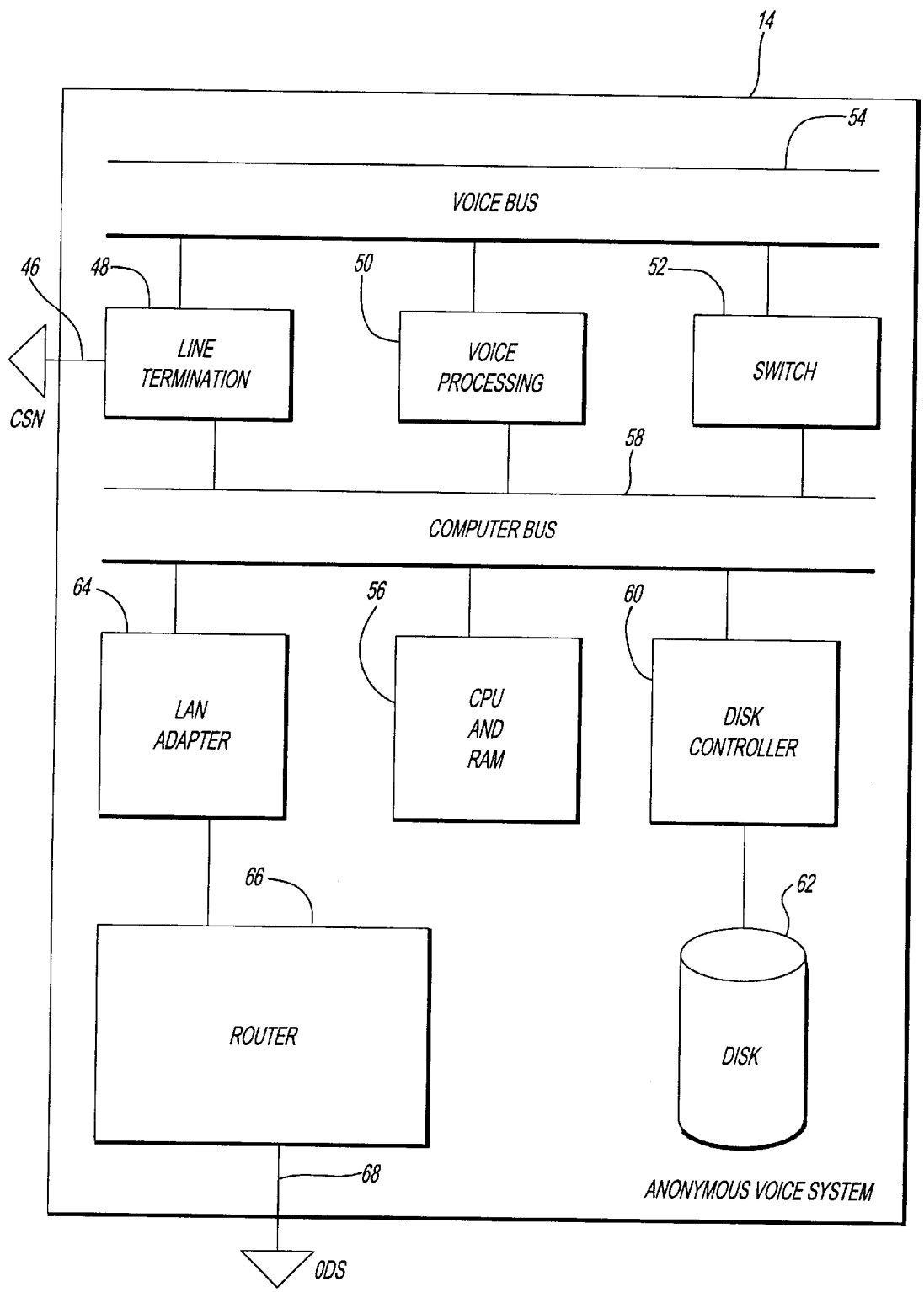
FIG. 3 is a schematic of an anonymous voice system.

FIG. 3 shows an embodiment of the Anonymous Voice System 14. The AVS 14 has a line termination unit 46 connected to the CSN 12 by access line 48. The line termination unit 46 terminates access line 48, detects network signaling for incoming calls and disconnects of established calls. The unit 46 may be a product sold by Dianatel under the designation EA 24 which terminates a DS1. The AVS 14 includes a voice processing card 50 that can record and playback speech, detect and generate DTMF signals, and perform call progress analysis. The card 50 may be a product sold by Dialogic Corp. under the designation D/121B which supports 12 DS0 voice channels. The AVS 14 may further include a switch card 52 that connects two DS0 channels on the line termination card 46, or connects a DS0 channel on the line termination card 46 to a voice channel on the voice processing card 50. The switch card 52 can also be used to monitor network signaling. The card may be a product sold by Dianatel under the product designation SS96 which provides a 96 by 96 non blocking switch that may be upgraded to a 192 by 192 non blocking switch. The line termination card 46, voice processing card 50 and switch card 52 are connected by a voice bus 54. The voice bus 54 may be a PEB (PCM expansion bus) cable sold by Dialogic that provides 96 DSO channels.

Each channel on the line termination card 46 and on the voice processing card 50 is connected to a channel on the switch card 52 and can be addressed by reference to a switch channel number.

The line termination card 46, voice processing card 50, and switch 52 are connected to a CPU and RAM 56 via a computer bus 58. The cards exchange control messages with the CPU over the bus 58. The voice processing card 50 also retrieves voice prompts from the RAM 56 over the bus 58. The protocol and content of the messages are described in documentation provided by the Dianatel and Dialogic product specifications. The computer bus 58 can be implemented using a conventional ISA bus. The CPU and RAM 56 can be provided by a PC motherboard with a microprocessor sold by Intel Corporation under the designation 80486. The AVS 14 may include a disk controller 60 that couples a disk drive 62 to the bus 58. The AVS 14 may also include a LAN adapter 64 which connects a router 66 to the computer bus 58. The router 66 connects the Anonymous Voice System 14 to a data communication link 68. The data link 68 is preferably connected to the Internet.

The software which controls the operation of the Anonymous Voice System 14 includes an operating system and a voice application generator. The voice application generator interprets (or compiles) scripting commands and interacts with the drivers used to control the line termination 46, voice processing 50, and switch 52. The drivers for these cards are supplied by the card manufacturer. Voice application generator software supports a set of commands which can be used to dial or answer calls, connect two DS0 channels to each other, and record and playback speech. The voice application generator also supports storage and retrieval of digitally encoded speech from the disk drive 62. The operating system may be the Voice Operating System (VOS) sold by Parity Software, which provides a voice application generator. VOS uses DOS as the operating system for low level control of the computing hardware The capacity of the exemplary embodiment, containing a Dianatel SS96 switch card 52 and one Dianatel EA24 line termination unit 46 supporting 24 DS0 channels, can be increased by adding additional line termination units, by increasing the capacity of the switch, or by implementing an embodiment which utilizes a large programmable switch, multiple PCs with voice processing cards, and another PC to control the operation of the programmable switch and the PCs with voice processing cards.

Voice bus 54 may be implemented using a Signal Computing System Architecture (SCSA) developed by Dialogic Corporation. In this embodiment, the switch 52 is not required. Both the line termination unit 46 and the voice processing unit 50 can issue commands to the SCSA bus 54 which allows any of 1,024 channels on the SCSA bus to be connected together.

If switch 52 is replaced by a conference bridge, then this system has the ability to connect more than 2 parties in an anonymous conference call.

Access line 48 is an ordinary high capacity link capable of carrying multiple DS0 circuits (or B channels) simultaneously such as DS1, DS3, PRI ISDN, or SONET OC3. Access line 48 may include a channel service unit, a DS3 multiplexor or other equipment required to connect to the line termination card 46.

Referring to FIG. 1, access line 69 connects the ODS 18 to the packet switched network 16. It is typically implemented as a high speed dedicated circuit i.e., DS1 or DS3. For smaller systems, multiple analog lines may be used.

Data communication link 68 connects the Anonymous Voice System 14 to the ODS 18. This link is used to pass messages between the two systems. This link can be implemented as: a dedicated circuit such as a DS0, an analog dial up link using modems at each end, a packet switched network, a local area network, a bus within a multiprocessor, or via software used to implement interprocess communication between processes running on the same computer. In the preferred embodiment, data communication link 68 is a packet switched network such as the Internet. Thus data communication link 68 and packet switched network 16 may be the same network.

If a dial up connection is used to implement data communication link 68, then router 66 would be replaced by a modem and LAN adapter 64 would be replaced by a modem adapter.

It is also possible to implement the invention so that the Anonymous Voice System 14 and the On-line data system 18 form a single integrated computer system. In this case software based interprocess communication is used to exchange messages between the two systems.

The Anonymous Voice System 14 can be implemented by either an interexchange carrier or a local exchange carrier. If a carrier implements the Anonymous Voice System, it is sometimes called by its functional name of "adjunct processor", or "attached prompting mechanism". In this case the Anonymous Voice System 14 would be located in a central office connected to a tandem switch via access line 48, a short cable without a channel service unit.

The Anonymous Voice System 14 can be implemented by a firm which is not a carrier. In this case, the system is sometimes called "Interactive Voice Response System" or "Customer Premise Equipment". In this embodiment, a channel service unit would be required to connect the Anonymous Voice System 14 to the circuit switched network 12.

The On-line data system 18 is a computing device with storage and communications capability which provides services such as electronic mail, chat, newsgroups, and access to information. Examples of the firms which provides these services are AMERICA ONLINE and PRODIGY. The Internet can also provide these services using a distributed architecture for the computing device.

The software which controls the On-line data system 18 is modified so that it exchanges messages with the personal computers 24, 26 related to the initiation of an anonymous voice call. The On-line data system 18 ensures that both parties want to establish an anonymous voice call, collects from both parties the information required to initiate an anonymous voice call, and sends a connect message 110 to the Anonymous Voice System 14 over the data communications link 68. When the call is complete, the Anonymous Voice System 14 sends the on-line data system 18 a disconnect message.

The process of establishing an anonymous voice communication is initiated when one party inputs a command into their personal computer. For text based interfaces to the on-line data system 18, such as commonly provided by Bulletin Board Systems, a party uses a global command to start the anonymous voice call routine on the On-line data system 18. For on-line systems with graphical user interfaces, an icon or menu command is used to initiate the request. This is implemented by modifying the client software which executes on the personal computer. This client software is distributed to subscribers by the firm offering the service.

Figure 4:
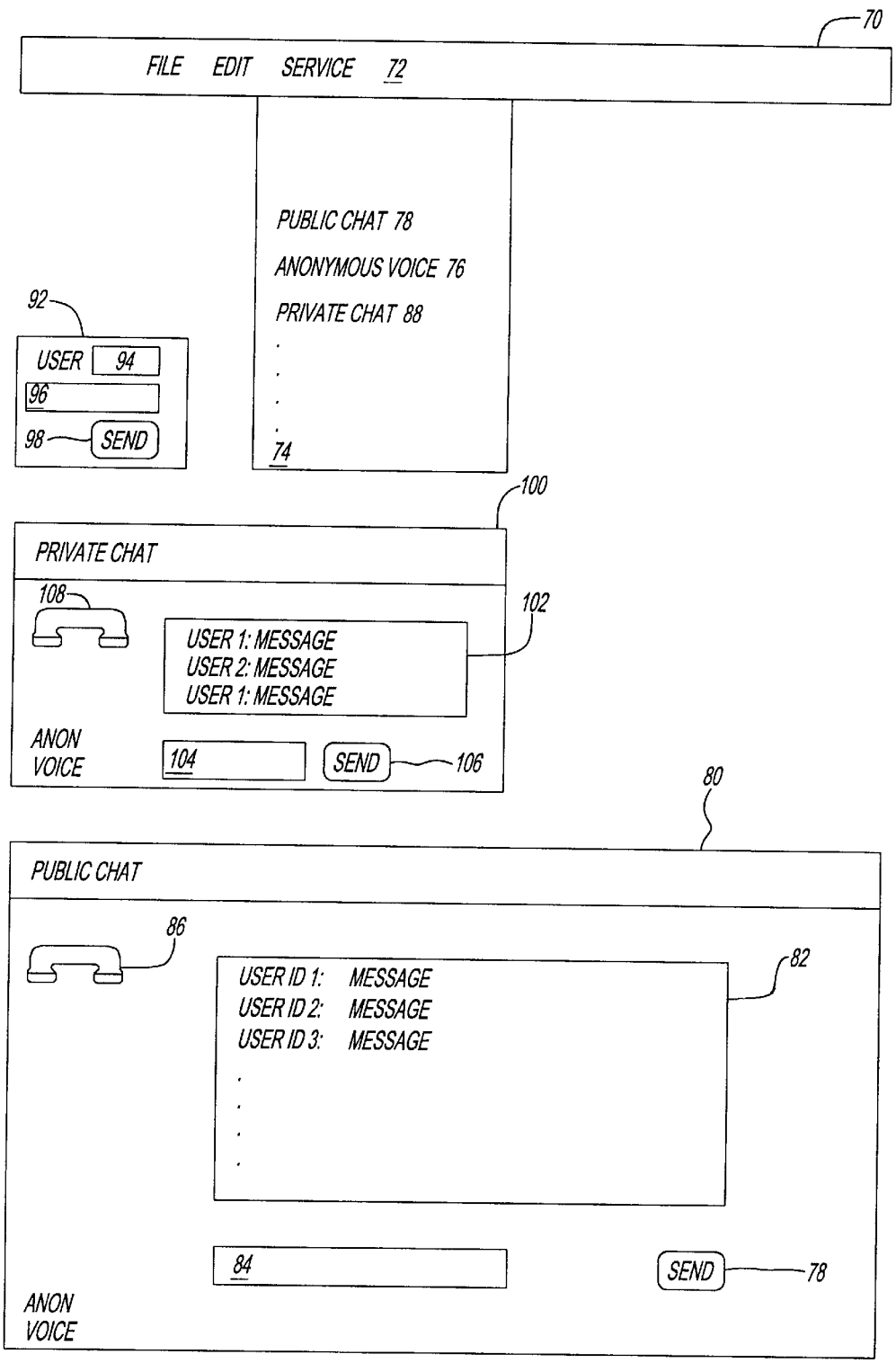
FIG. 4 is a schematic of a graphical user interface.

FIG. 4 shows a full screen of a computer which contains graphical user interface which may be used to initiate an anonymous voice call.

Menu bar 70 allows the user to select commands for execution at any time by pointing and clicking on the appropriate command. Clicking on the SERVICE menu command 72 causes a pull down menu 74 to be displayed. Pointing and clicking on the Anonymous Voice command 76 will initiate an anonymous voice call.

Selecting Public Chat 78 will bring up the Public chat window 80. This window displays the messages typed by other users in list box 82 and allows messages to be typed in text box 84. Messages in box 84 are sent to other parties who are also in public chat when button 78 is selected. The icon 86 will initiate an anonymous voice call when selected.

Selecting Private Chat 88 on pull down menu 74 will bring up dialog box 92 which requests the name 94 of the other user, a message 96 to be sent to that user, and a button 98 causes the message to be sent to the other user. When the other user accepts the private chat, the On-line data system 18 sends a message to the personal computer which results in the display of the window 100. This window 100 displays the messages 102 sent between the two users, provides for the sending of messages to the other user 104, 106 and includes an icon 108 for initiating an anonymous voice call.

The graphical interface features shown in FIG. 4 exist in present on-line services except for the Anonymous Voice command 76 which may be located in the menu bar 70 or a pull down menu 72, and the Anonymous Voice icons 86 and 108 located in public and private chat windows.

The anonymous voice icon 86, 108 can also be implemented as a "floating icon" within the client software. In this embodiment, the icon will float to the top of the monitor screen of personal computer 24, 26 and be constantly visible above all other windows on the screen.

FIG. 5 shows information which can be stored in the AVS 14. The information corresponds to data for the anonymous callers. Two types of records are stored: a couple record 80 and a voice message record 82. A couple record 80 is set up for each pair of callers who are connected anonymously. The couple record contains party information 84 about each party in the couple who has been connected together in an anonymous call. The party information 84 may contain the telephone number 86 of the corresponding party. The couple record 80 is created when two parties make their first anonymous call. The couple record is deleted if either party requests its deletion, or if no anonymous calls have been made for a specified period, for example three months.

When a person calls the system, automatic number identification (ANI) is used to obtain the callers telephone number. The system can identify the couple record to be used by using the matchcode entered and the ANI.

When the matchcode is being selected, each party must ensure that they do not use the same matchcode for two different parties. If the calling party uses the same matchcode twice, the Anonymous Voice System 14 will attempt to connect the calling party to the other party associated with the first couple record for the calling party which contains the matchcode. The matchcode 87 is stored in the coupled record 80 and may be any alphanumeric code agreed to by the two parties. To simplify DTMF input, the matchcode can be restricted to numeric characters.

The present invention provides at least three different methods of creating anonymous voice communication; "standalone", "on-line", and "single party initiated". The standalone process starts when two parties agree on a matchcode and a time without revealing their identity to each other. Standalone anonymous communication is established when two parties call the system at about the same time and enter the same matchcode. The AVS 14 compares the matchcodes and connects the parties if the codes match. The first time a party calls and enters a matchcode, the couple record 80 does not match based upon the matchcode entered and the ANI of the calling party. The next party who calls and enters the same matchcode, and does not have an existing couple record for that matchcode, will be connected to the first party. The phone numbers 86 and match code 87 are then stored in the couple record 80. If one party makes a subsequent call and enters the same matchcode, the Anonymous Voice System 14 will identify the couple record and wait for a call which has an ANI equal to the telephone number of the other party, where the other calling party enters the same matchcode.

For an on-line anonymous call request the Anonymous Voice System 14 receives the telephone numbers of both parties in a connect message from the ODS 18. The anonymous voice system 14 dials both parties and connects them without reference to a matchcode. Optionally, either party may elect to call the system rather than have the system call them. The matchcode is optionally included in the connect message so that the two parties can initiate subsequent anonymous calls using the standalone method or the single party initiation method.

The single party initiated method can be used after a first anonymous call is made and a couple record 80 is created. The party initiating the call, dials the system and enters the matchcode. The Anonymous Voice System 14 retrieves the telephone number of the second party from the couple record and dials the second party, if the second party has indicated that they will accept calls from the first party. If a couple record with a matchcode is created during the first call, any method can be used to establish the first anonymous call including the method described in U.S. Pat. Nos. 4,847,890, 5,058,152 and 5,361,295 issued to Solomon which are hereby incorporated by reference.

The couple record 80 has a first call switch 88 (1=first use of couple record, 2=subsequent use of couple record) that is used primarily for standalone anonymous calls to determine whether the Anonymous Voice System 14 should wait for a caller with a specific ANI (first call switch 88=2), or the Anonymous Voice System 14 should connect the next caller who enters the same matchcode and does not have an existing couple record which matches on the calling telephone number.

By having the Anonymous Voice System 14 delete the couple record on disconnect, all calls will be treated as first time calls. In this case, the Anonymous Voice System 14 will have the caller wait until another caller enters the same matchcode. In this embodiment, each caller will be connected to the next caller who enters the same matchcode.

The couple record 80 has a online status 90 (1=not online, 2=online) that is used by the Anonymous Voice System 14 to identify "online" anonymous calls.

The couple record 80 has a date of last activity 92 that indicates the last time the couple record was used. It is used to delete the couple record 80 if there has not been any activity for a specified period of time.

The couple record contains information on each party which participates in the anonymous phone call. The party information 84 on each party includes a telephone number 86, status 94 (0=inactive, 1=waiting, 2=connected), a field that indicates whether a party will accept anonymous calls initiated by the other party 96 (0=don't accept, 1=accept), a pointer to the first voice message which has been left for this party 98. The information may also contain an AVS channel 100 which identifies the specific switch channel on which the party is connected to the Anonymous Voice System 14 and a VP channel 102 that identifies the switch channel on which the voice processing card is connected to the caller.

The message record 82 is set up when one party records a voice message for the other party. The next message field 104 points to the next message in the chain or is 0 for the last message. The message field 106 contains the audio message which is stored in a digital PCM format.

FIG. 6 shows the information contained in the messages exchanged between the Anonymous Voice System 14 and an on-line data system 18. A Connect message 110 is sent from the on-line data system 18 to the Anonymous Voice System 14 to request an online anonymous voice call. A disconnect message 112 is sent from the Anonymous Voice System 14 to the On-line data system 18 to indicate the end of an anonymous call.

The message id 114, identifies the type of the message connect 110 or disconnect 112. The first caller info 116 and second caller info 118 describe each party. Caller info 122 contains the fields which describe each party. The message can contain an optional matchcode 120 which is not used to set up the "online" initiated call but can be used to set up subsequent calls using the "standalone" or "single party initiation" method.

Caller information 122 provides detail on the fields used to describe each caller. A caller identifier 124 is used to identify a party requesting an anonymous voice call. In the preferred embodiment, this identifier would be the telephone number of the party. Alternatively, the identifier could be a subscriber id which identifies the party as a subscriber to the anonymous voice service. In this case, the Anonymous Voice System 14 would maintain a file which provided the telephone number associated with each subscriber id. The Dial in/Dial out field 126, indicates whether the Anonymous Voice System 14 should dial the party or the party will dial the system. The ODS ID field 128 identifies the On-line data system 18 which is initiating the request.

The disconnect message 112 is sent from the Anonymous Voice System 14 to the On-line data system 18 when the anonymous voice call is complete, or when the Anonymous Voice System 14 is unable to set up the call. The message id 114 identifies the message as a disconnect message. The message status field 132 indicates whether or not the call was successfully completed. First party completion information and second party completion information 134, 136 describe call completion information for each party.

Completion info 138 provides detail on the information transmitted when a call is completed. The start and end time of the call, 140, 142 is included for billing the parties by the on-line data system 18 or to allow the on-line data system 18 to calculate commissions owing for initiating the call. The caller identifier 144 identifies the party making the call; this field corresponds to 124 in the caller info 122. The ODS ID field 146 identifies the On-line data system 18 which initiated the call, this field corresponds to 128 in the caller info 122.

FIGS. 7a–d show the operation of the Anonymous Voice System 14. The system will initially be described without use of the On-line data system 18, then described using the On-line data system 18.

When the Anonymous Voice System 14 is initialized, it sets the line termination card 46 to monitor the access line 48 for signals (incoming call, disconnect) from the circuit switched network 12. After initialization, the Anonymous Voice System 14 proceeds to the event loop 200 where it waits for signals from the CSN 12 or messages from the ODS 18. When an event occurs, the Anonymous Voice System 14 proceeds to receive call 201, disconnect 218, or connect message 205, depending upon the type of the event.

Before initiating a standalone anonymous voice call, both parties must agree, without revealing their identity to each other, upon a time to call and a matchcode that both will input to the Anonymous Voice System 14. There are several ways in which they can reach this agreement. For instance, if they are both subscribers to an online data service, such as PRODIGY, they could exchange electronic mail messages. Alternatively, one party may place a personal ad, wherein the other party responds to the PO Box number with a suggested time and matchcode. Alternatively, with Voice Mail personals, it would be possible for the two parties to exchange voice mail messages until they agree upon a time and a matchcode. Any of these methods or other methods could be used by the parties to agree upon a time and a matchcode for the anonymous call.

The first party dials the "standalone" telephone number of the Anonymous Voice System 14 at approximately the agreed upon time. The number dialed could be a special service number in the case of a carrier based service, or an 800, 900, or local number for a carrier or non carrier based service. The circuit switched network 12 signals (a "wink" is used for DS1 service) the Anonymous Voice System 14 that there is an incoming call on a particular AVS channel. This signal triggers the Anonymous Voice System 14 to proceed from the event loop 200 to the receive call event in block 201.

In processing block 202 the switch 52 is instructed to connect the incoming AVS channel to an available voice processing channel on the voice processing board 50. The voice processing board 50 signals the circuit switched network 12 that it is ready to accept the Automatic Number Identification (ANI), i.e., the telephone number of the calling party and Dialed Number Identification Service (DNIS), i.e. the called telephone number. The circuit switched network 12 sends the ANI and DNIS to the voice processing board 50. The voice processing board 50 uses DTMF or MF tone detection to receive the ANI and DNIS from the network 12. The voice processing board 50 signals that it is ready to answer the call and the circuit switched network 12 connects the calling party to the voice processing board 50 over access line 48.

In decision block 204, the AVS 14 determines whether the DNIS corresponds to the telephone number used for the standalone matchcode service. If the first caller dials the standalone telephone number of the Anonymous Voice System 14, the program proceeds to block 206.

In block 206, the AVS 14 reads digitized voice data from the disk 62, transfers the digitized voice data to the voice processing board 50, and instructs the voice processing board 50 to play the prompt to the caller. The prompt greets the caller and asks the caller to input the matchcode. The voice processing board 50 is instructed to detect DTMF input from the caller and to send the captured digits back to the program executing in the CPU 56. The captured digits are designated as a matchcode. If the ANI is not available from the network, then the Anonymous Voice System 14 would prompt the caller to enter his telephone number, as well as the matchcode.

The caller can also input the matchcode using voice recognition. A voice recognition board would have to be installed in the Anonymous Voice System 14 and the CPU 56 would instruct the switch 52 to connect the caller to a channel on the voice recognition board.

In decision block 208, the Anonymous Voice System 14 searches the couple records 80 stored on the disk 62 for the matchcode entered by the caller. The first time the caller calls, the matchcode may or may not be found depending upon whether or not another couple has already used the same matchcode. If the matchcode has never been used before, then the process proceeds to block 214 from decision block 208. If another couple has used the same matchcode, the program finds a couple record with the same matchcode and proceeds to decision block 210. In block 210, the AVS 14 determines whether the calling party's ANI matches the telephone number 86 in either the first party info 84a or the second party info 84b for any couple record that contains the matchcode entered by the calling party. If the determination is NO (i.e., the first party is calling with a matchcode he has never used before), the process proceeds to decision block 212 which determines whether any of the couple records with the same matchcode is a first call (first call switch 88=1). Since this is the first caller, the couple record will not exist and the process will continue at block 214.

In the unlikely event that two different couples are making their first call at about the same time and both have selected the same matchcode, then the first caller of the first couple may be connected to the first caller of the second couple.

In block 214 a new couple record 80 is created and stored on the disk 62 in block 214. The matchcode 87 is set to the value entered by the calling party, the first call switch 88 is set to 1 ( first call), the online status 90 is set to 1 (not online) and date of last activity 92 is set to the present date. The first party info 84a would store the telephone number 86 of the calling party (ANI), the status field 94 is set to 1 (waiting), the AVS channel 100 identifies the switch channel to which the incoming call is connected, the VP channel 102 identifies the switch channel to which the voice processing channel for this caller is connected, the accept calls field 96 is set to 1 (accept calls), the first message field 98 is set to 0, and the telephone number 86 of the second party info 84b would be set to 0. The calling party is played a prompt which informs him that the other party has not called in and asks him to wait. The CPU 56 instructs the voice processing card 50 to play music retrieved from the disk 62 to the caller. The process then proceeds to block 200 to wait for the next event.

The second party then dials the Anonymous Voice System 14. The Anonymous Voice System 14 proceeds as above except that in block 208 the matchcode is found, in block 210 the telephone number of the second party is not within the couple record, and in block 212 the process determines that the first call switch 88 has been set to 1. The process proceeds to block 215, which updates the couple record 80 for the information relating to the second party 84b similarly to the update of the first party info as described in block 214.

In block 216, the CPU 56 instructs the switch 52 to disconnect both callers from the voice processing board 50 and to connect the two channels identified by the AVS channel 100. The status 94 field for both parties is set to 2 (connected) and the VP channel 102 to 0. The program goes to 200 to wait for the next event.

The two parties are now connected anonymously and can communicate by voice without revealing their identity to the other party. However nothing would stop either party from revealing their identity during the conversation.

When they finish their conversation, the parties hang up. The CSN 12 signals the Anonymous Voice System 14 that one of the parties has hung up. The line termination card 46 detects the signal from the network and posts an event which causes the Anonymous Voice System 14 to start executing at step 218. In block 220, the process identifies the couple record 80 associated with the disconnect by searching on the AVS channel 100 field in the first party info 84a and second party info 84b. The line termination card 46 sends an on hook signal to the circuit switched network 12 for the AVS channel 100 associated with each party. The process also updates the couple record 80 including setting the first call switch 88 to 2 (not first call), the online status 90 to 1 (not online), the status 94 to 0 (inactive) and the AVS channel 100 to 0 for both parties.

The required billing functions are performed by the process in block 222. If a carrier's billing and collection service is used (i.e. 900 or 976 numbers), then the call is recorded so that the statement from the carrier can be audited. Credit cards can also be used to pay for the call. The credit card number is entered using voice prompts and DTMF at the start of the call. The card number is sent to a credit card processor to charge the call to the card. A similar process can be used to debit a checking account. Billing can be handled on a subscription basis as well. The telephone number would be used to identify a subscriber's account. Billing records would be produced at the end of each anonymous voice call and periodically the customer would be billed by credit card for all calls made during the billing period. If a carrier implemented the AVS 14 as an adjunct processor, then block 222 would generate an Automatic Message Accounting (AMA) record.

After the initial call, the two parties can schedule additional anonymous calls with the same matchcode. In this case when the first caller dials the Anonymous Voice System 14, the process starts executing at block 201 and proceeds to block 208 as before. In the subsequent call, the matchcode and ANI are found in a couple record 80 and the process continues to decision block 224. Since this is the first party, the other party is not waiting and the process proceeds to decision block 226. Assuming there are no messages, block 230 uses the voice processing board 50 to play a menu of possible actions. The first caller selects wait and block 234 updates the status 94 to indicate that the first party is waiting. The Anonymous Voice System 14 puts the caller on hold and proceeds to event loop 200 to wait for the next event.

When the second caller dials the AVS 14, the program proceeds the same as for the first caller. However, at step 224, the AVS determines that the first caller is waiting (status 94=1) and proceeds to step 216 which connects the callers. At this point the two callers are connected in an anonymous phone call using the same matchcode for a subsequent call.

If the first caller hangs up before the second party calls in, the circuit switched network 12 sends a disconnect notification to the Anonymous Voice System 14 and the process proceeds to block 220. The process of block 220 would execute as described above except that information for the second party 84b would be zeroed out for the billing process 222 and if the first call switch 88 was set to 1 (first call), the couple record 80 would be deleted.

If one of the parties is unable to participate in a scheduled anonymous voice call, the AVS 14 provides the functionality required to leave a message for the other party. The first party dials the system prior to the agreed upon time and enters the matchcode. AVS 14 proceeds through blocks 201, 202, 204, 206, 208, 210, 224, 226 as described above to the menu at 230. At this menu, the caller selects the leave message option and the program proceeds to block 228. In block 228, the voice processing card 50 records a message from the caller which is stored on the disk 62 in a message record 82. The first message field 98 is used to point to a linked list of message records 82. The AVS updates the couple record, disconnects the caller and proceeds to the event loop 200 to wait for the next event.

When the other party calls at the scheduled time, the AVS 14 proceeds from block 201 to block 226 as above. First message field 98 indicates that messages are available.

In block 232 the message pointed to by the first message 98 is retrieved from the disk 62. The first message 98 is updated with the next message field 104. The voice processing card 50 plays the message for the caller. The message is deleted from the disk 62 and the process returns to step 226 to determine if there any more messages.

After the other party has listened to all the messages, the voice processing board 50 plays a prompt which provides the caller with a menu. The choices in the menu are: wait 234, leave a message 228, delete the couple record 236, accept calls initiated by the other party 238, don't accept calls initiated by the other party 240, initiate a call to the other party without prior scheduling 242, or exit 244 (hang up). The other party may select the leave message option and proceed as above. In this manner the two parties are able to exchange voice messages anonymously in preparation for another anonymous phone call.

To permanently break off contact with the other party, the caller may select the delete block 236 from the menu 230. The couple record 80, identified by the matchcode from step 208 and the ANI from step 210, is deleted in block 250.

The Anonymous Voice System 14 provides both parties with the ability to control whether or not they will accept calls initiated by the other party. To control this option, the party calls the Anonymous Voice System 14. The process executes blocks 202 and 204, finds the matchcode at step 208, finds the calling party's telephone number at 210, determines that no one was waiting at 224, plays any available messages at 226, and at the menu block 230 the caller selects 238 to enable the other party to initiate calls or selects 240 to disable "single party initiated" calls from this party. In block 246, the accepts calls field 96 is set to 1 (accept) for the caller. In block 248, the field 96 is set to 0 (don't accept calls). The process then disconnects the caller and returns to the event loop 200.

Process blocks 246, 248, and 250 may be enhanced to provide the caller with the option of updating/deleting all couple records associated with their telephone number without regard to the matchcode.

The present invention allows a single party to initiate anonymous voice communication with the consent of the other party. After the first anonymous call, one of the parties may wish to establish a second call without prearranging a time for the call. "Single party initiated" anonymous calls provides this capability provided that the other party has consented to receiving the call. After a couple record 80 has been established by a first call, the Anonymous Voice System 14 can identify the telephone number 86 of the second party 84b based upon the matchcode 87 and ANI of the first party 84a.

If the equivalent of a couple record (matchcode and two telephone numbers) is stored during the first anonymous call, then it is possible for either party to initiate an anonymous voice call. This modification to "chat" systems and "ads plus cut through" systems would allow, after the first anonymous call, either party to establish the connection.

To place a single party initiated call after a couple record 80 has been created, the caller dials the standalone telephone number of the Anonymous Voice System 14. The process proceeds to step 230 where the caller selects the single party initiation step 242. In block 252, the process determines whether the other party is willing to accept single party initiated calls by checking the accepts calls field 96 for the other party in the couples record. If single party initiated calls are not accepted the system plays a message to the caller in block 254 and returns to block 230 where the caller can make another choice from the menu.

If the other party is willing to accept single party initiated calls, the process continues to block 256 which records a greeting from the calling party. In block 258, the process calls the other party using the telephone number 86 in the other party's section of the couple record 80. If in decision block 259, it is determined that the other party does not answer the phone, i.e.. busy, no answer, answering machine or fax, then the program plays a message for the calling party in block 260, updates the couple record, and then returns to the menu in block 230.

If the other party answers the phone, in block 262 the process plays a greeting to the other party which includes the greeting from the calling party. The receiving party has the ability to accept or reject the call in decision block 264. If the call is accepted, the parties are connected and the couples record 80 is updated in block 266. The process then returns to the event loop 200 to wait for the next event.

If the other party rejects the call, the program proceeds to block 268 where the other party is disconnected, the couple record is updated, a message is played for the calling party, and the process continues to block 230 where the calling party can select another option.

Periodically, the Anonymous Voice System 14 may scan the couple records 80 and delete a record if the date of last activity 92 is greater than a specified period.

Several enhancements can be made to this invention. For instance, passwords can be associated with every telephone number in the couples record. When a party dials in or the system dials out, the party connected will be asked to provide a password. This will ensure that the right person has been contacted when there is more than one person at the telephone number. Another enhancement would allow one party to pay the charges associated with the other party's portion of the anonymous voice call. The AVS 14 could prompt each caller to indicate whether or not the party was willing to pay for the other party. This information could be recorded in the couple record 80 and used in step 222 when the call is billed.

The Anonymous Voice System 14 may connect the wrong parties in the unlikely situation where two couples have selected the same matchcode and time for their first call. This problem could be avoided by assigning a unique identifier to every user of the Anonymous Voice System 14. When two parties want to initiate an anonymous voice call, they would reveal their identifier to the other party and both parties would use their identifier and the other party's identifier as the matchcode. Since this matchcode would be unique for every couple, there is no chance of connecting the wrong parties. However, this approach has the disadvantage of requiring the assignment of unique user ids to every user, and it is not possible to completely break off contact since the other party will still know the unique identifier assigned to the party wishing to break off contact.

Another approach to generating unique matchcodes is to have an automated system assign them on request. For instance if a couple uses a Voice Personals system to set up an anonymous call, then the couple could request the system to provide them with a unique matchcode. Each system would have a unique identifier to which it would attach a sequence number. In this manner, unique matchcodes could be provided to couples using the Anonymous Voice System 14.

Two parties can also initiate an anonymous voice call using an On-line data system 18. Both parties would use personal computers 24, 26 to log onto the On-line data system 18. The two parties may contact each other using public chat, private chat, electronic mail, or newsgroups through the ODS 18. The parties can communicate via the On-line data system 18 without revealing their identity to each other because users are commonly identified on these systems by screen names, handles, or subscriber ids which only the operator of the On-line data system 18 can translate into the subscriber's identity.

Either party can initiate an anonymous voice connection. If they are using a text based service such as a bulletin board system, the first party sends a text string to the On-line data system 18 which invokes a global command. A global command is a command which can be executed at any point in the online session; it is not necessary to be at a menu which contains the command. Referring to FIG. 4, if the parties are using an On-line data system 18 which supports a graphical user interface, then the parties may select a menu command such as Anonymous Voice command 76 or click on an icon such as 86 or 108 which are accessible while in public or private chat.

In response to these commands, the On-line data system 18 or the client software running on the personal computer may request the screen name of the second party. The On-line data system 18 then sends a message to the personal computer of the second party to inquire whether the second party wishes to start an anonymous voice call. If the second party declines, the anonymous voice call request is refused. If the second party accepts, then the On-line data system 18 requests information from both parties required to set up an anonymous voice call. This information includes the telephone number of the telephone stations 20, 22 which they will use to make the anonymous voice call. The ODS 18 may also request whether the parties will call the Anonymous Voice System 14, or whether the system will call the parties. The ODS 18 may also collect a matchcode 87 that can be used to initiate subsequent anonymous calls.

After collecting this information, the On-line data system 18 sends a connect message 110 to the Anonymous Voice System 14 over data communication link 68. The On-line data system 18 may then display a message on the personal computer which instructs the parties to either dial the telephone number of the Anonymous Voice System 14, or wait for an incoming call on the telephone which they specified to receive the call. If necessary, the On-line data system 18 may include a short delay to ensure that the Anonymous Voice System 14 is ready to receive incoming calls.

Figure 7A:
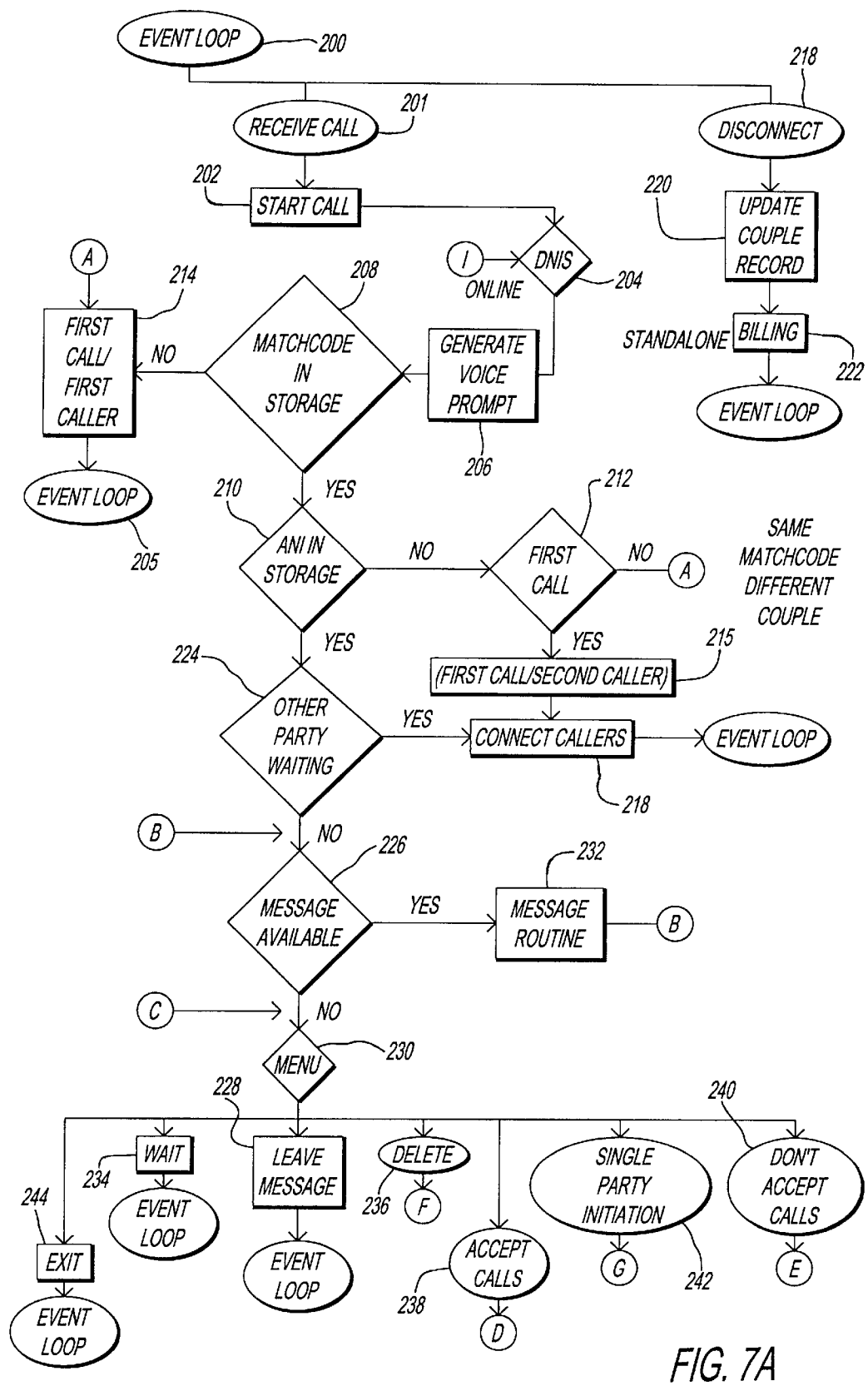
FIG. 7a–d are flowcharts showing the operation of the system.
Figure 7B:
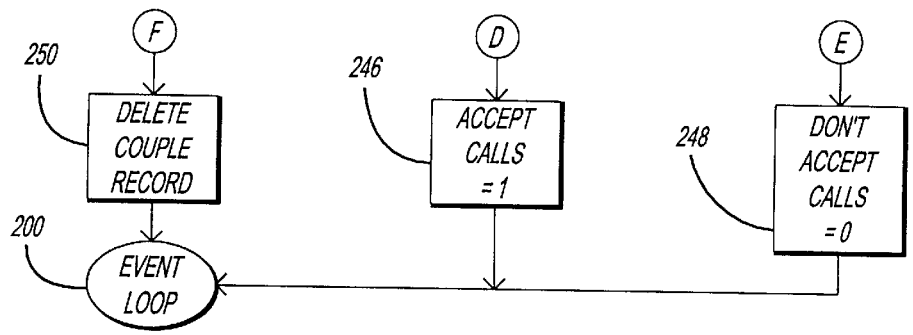
Figure 7C:
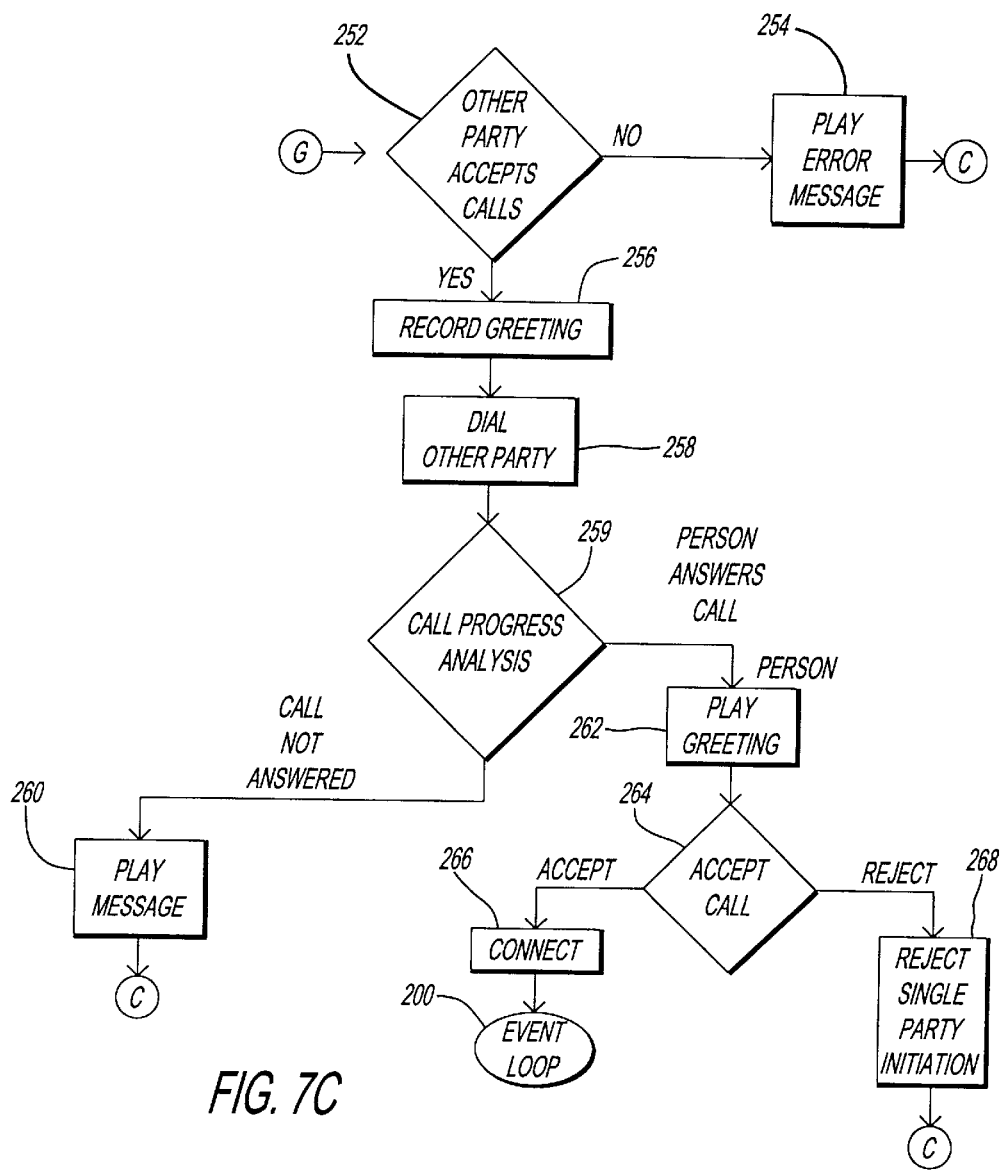
Figure 7D:
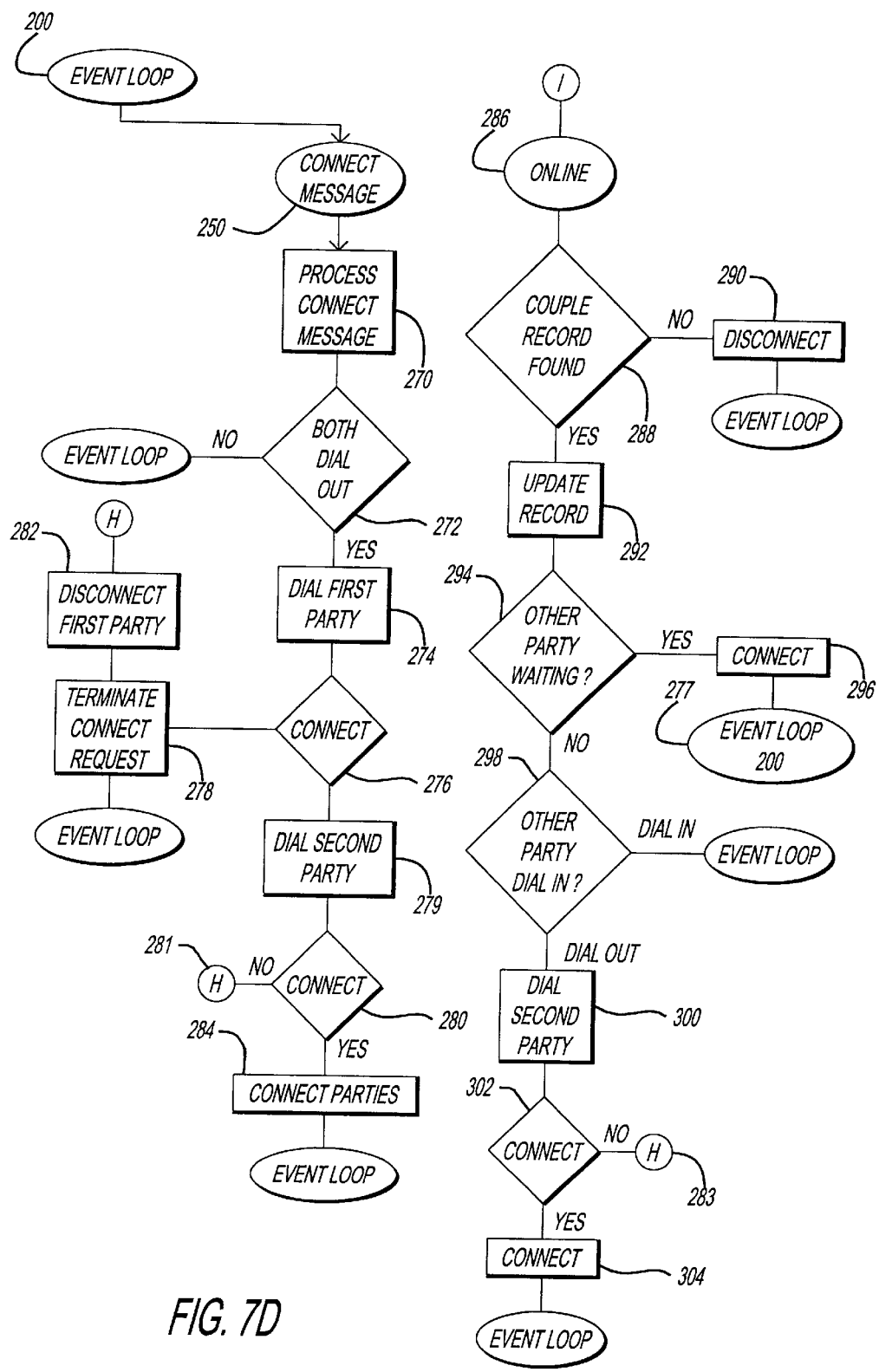

Referring to FIG. 7d, when the Anonymous Voice System 14 receives a connect message 110 in block 250, the system would begin processing at block 270. The process would search for a couple record 80 that contains telephone numbers 86 which match the telephone numbers 124 of the parties provided in the connect message 110 by the ODS 18. If a matching couple record is not found, this step would set up a couple record 80 using the information from the connect message 110. The first call switch 88 is set to 1 (first call), the online status switch 90 is set to 2 ( online), the date of last activity 92 is set to today's date, and the first 84a and second 84b party information is entered. The telephone number 86 is set to the caller identifier 124, the status 94 is set to 0 (inactive), the accept calls field 96 is set to 1 (accept calls), the first message field 98 is set to 0 (no messages), the AVS channel 100 is set to 0, the ODS id 128 is set to the OSD id 128 from the connect message, and the dial in/dial out field 126 is set to dial in/dial out 126 from the connect message. If a matching couple record 80 is found, then only the online status 90, date of last activity 92, AVS channel 100, ODS id 128, and Dial in/dial out 126 fields are updated.

The process proceeds to decision block 272 to determine whether both parties are dial out (dial in/ dial out 126=2 in the couple record 80). If either party is dial in, the process returns to the event loop 200 to wait for one or both parties to call.

If both parties are dial out, the process dials the first party using the first party telephone number in block 274 and starts a call progress analysis routine in decision block 276. If the first party does not answer (busy/no answer, fax or answering machine) the process continues to block 278 where the AVS sends a disconnect message 112 to the On-line data system 18. The message has a status of 1 indicating that an error occurred and the call was not set up. The process deletes the couple record 80 if the first call switch=1 and returns to the event loop 200.

If the first party answers the phone, the process dials the second party in block 279. The process also updates the status 94 of the first party to 1 (waiting) and AVS channel 100 to the channel on which the call was placed. The process determines whether the second party answered the phone in decision block 280. If the second party does not answer, the first party is disconnected in block 282 and the connect request is terminated in block 278. If the second party answers, the two parties are connected in an anonymous voice communication in block 284. The process updates the couple record 80 and then awaits the next event.

As an alternate method for establishing an anonymous voice communication, the parties may choose to dial in. In this case, the connect message 110 is processed at block 270 and then the decision block 272 proceeds to the event loop 200 to wait for the parties to call. A first party may call the AVS 14 using the system telephone number associated with an online service request. The circuit switched network 12 signals the Anonymous Voice System 14 that there is an incoming call and the process begins executing at block 201. The process collects the ANI and DNIS for the call in block 202 and the call is identified as an online request in block 204 using the DNIS i.e., the called number. The process then proceeds to block 286.

The process plays a greeting to the caller and then in block 288 checks to see if there is a couple record 80 with an online status 90=2 (online) and a telephone number 86 equal to the ANI. If these conditions are not met, the caller is disconnected in block 290 and the program returns to the event loop 200.

If a matching couple record is found, in block 292 the couple record is updated i.e. status 94 equals 1 (waiting), and AVS channel 100 is set to the channel on which the call was received. In decision block 294 the process determines whether the other party is waiting. If the other party is waiting, the program connects the two parties and updates the couple record in block 296, and proceeds to the event loop 200 to wait for the next event.

If the other party is not waiting, then in decision block 298 the process determines whether the other party has selected dial in. If the dial in/dial out field 126 is set so that the other party is dial in (1), the process proceeds to step 200 to wait for the next event. If the other party is set as "dial out", the process dials the other party in block 300. Decision block 302 monitors call progress. If the other party does not answer, the process proceeds to blocks 282 and 278 to terminate the call. If the other party answers the call, then in block 304 the two parties are connected in an anonymous voice call and the couples record is updated. The process then proceeds to step 200 to wait for the next event.

When the two parties have finished talking, they hang up. The circuit switched network 12 sends a disconnect notification to the Anonymous Voice System 14. The Anonymous Voice System 14 jumps to block 220 of FIG. 7a. A disconnect message is sent to the On-line data system 18 when the online status 90=2 (online). The On-line data system 18 may use the disconnect record when it periodically bills its subscribers for their use of the anonymous voice service as well as other services. If the matchcode 87 in the couples record is blank, the couples record is deleted since the two parties indicated that they do not want to use the Anonymous Voice System 14 for subsequent calls.

Several enhancements are possible for this invention. An On-line data system 18 can maintain a record comparable to the couple record 80. The On-line data system 18 could use this record to support single party initiation of anonymous voice calls. The connect message 110 would have to indicate that the connect request was for a single party initiated call so that the Anonymous Voice System 14 could verify that the second party wanted to accept the call.

It would also be possible to asynchronously schedule an anonymous voice call. The first party would enter their information associated with the anonymous voice call, a proposed time for the call, and the user id of the second party. When the second party logged on, the On-line data system 18 would ask whether the party wanted to accept the anonymous call at the suggested time from the requesting party. If the party accepts, the party's information is entered and the On-line data system 18 sends the connect message 110 to the Anonymous Voice System 14 at the specified time.

Another embodiment of the "online" system would allow for multi-party anonymous calls. In this case the connect message 110 would contain multiple caller info 122 sections, one for each participant in the multi-party anonymous call. The ODS 18 would request information from each participant, and transmit the information for each participant to the AVS 14. The AVS 14 would contain a conference bridge card as well as the switch 52. The AVS would dial each of the participants, or wait for their call, and then connect them in a conference call using the conference bridge. When the participants hang up, a disconnect message would be sent to the ODS 18 with information on each participant.

If the On-line data system 18 bills its subscribers for anonymous calls, then the ODS 18 may limit the duration of a subscriber's call. The On-line data system 18 may calculate a limit for a subscriber and place the limit in the connect message 110. The Anonymous Voice System 14 may set a timer to expire when the subscriber's call reaches the time limit. If the timer expired before the caller hung up, the Anonymous Voice System 14 would disconnect the caller.

For the sake of brevity many error conditions have not been described. For instance the connect and disconnect messages could be acknowledged by the receiving system. Thus if the Anonymous Voice System 14 did not have sufficient capacity to handle a connect message 110, it would send an acknowledgment which rejected the request. The On-line data system 18 would be able to inform the two parties that their request was rejected and that they can try again later.

Figure 8:
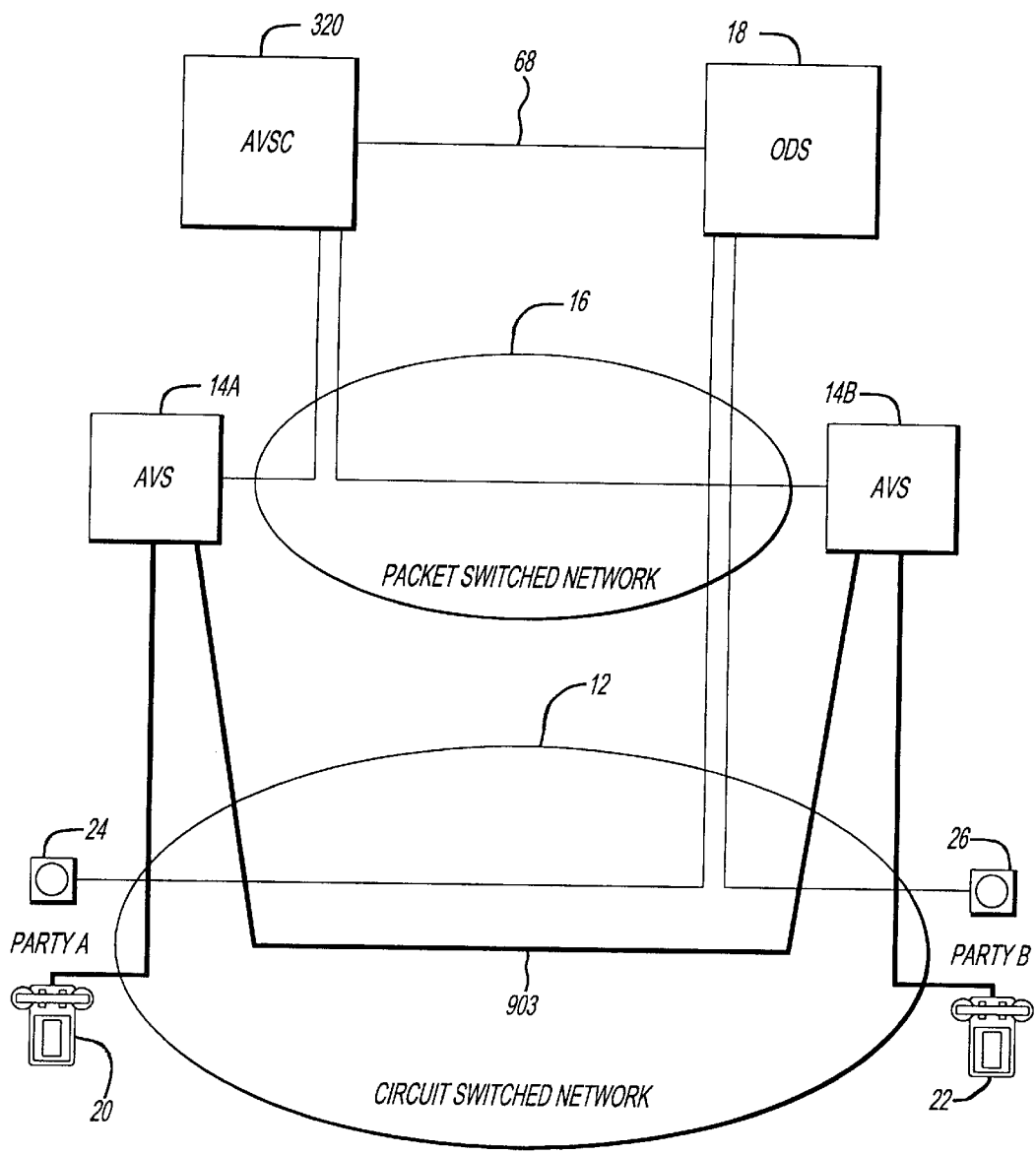
FIG. 8 is a schematic showing an alternate embodiment of the system.

FIG. 8 is a schematic of a distributed implementation of the present invention. This embodiment is advantageous in that an anonymous voice connection requiring only one long distance call can be established between two parties in remote cities. This is accomplished by placing an Anonymous Voice System 14A and 14B in each city. The parties make a local call to the Anonymous Voice System 14 in their city. The first Anonymous Voice System 14A dials the second Anonymous Voice System 14B to establish a connection 903 so that the two parties can be connected anonymously. Although two AVS 14A and 14B are shown and described, it is to be understood that numerous Anonymous Voice Systems may be connected to the system of the present invention.

In this embodiment, many components are the same as the elements shown in FIG. 1 including the telephone stations 20, 22, the personal computers 24, 26, the circuit switched network 12, the packet switched network 16 and the On-line data system 18. In the preferred embodiment, the Internet would be used to implement the packet switched network 16. As in the previous embodiments, the invention can function without the personal computers and the On-line data system The Anonymous Voice Systems 14A, 14B are modified so that the systems can exchange messages over a packet switched network 16 with each other, and with an Anonymous Voice System Controller (AVSC) 320. The Anonymous Voice System Controller 320 is a computing device such as a personal computer running the Windows NT operating system.

The Anonymous Voice System Controller 32 stores the couple records 80 for Anonymous Voice Systems 14A and 14B. An AVS Id field 722 identifies the AVS 14 that will process the anonymous call for each party. To read from or write to the couple record 80, an Anonymous Voice System 14 sends a message to the Anonymous Voice System Controller 320 which responds to the request by updating the couple record in its database or by retrieving the requested couple record from its database. The Anonymous Voice System Controller 320 may ensure that the two Anonymous Voice System 14 are operating in sync by forwarding updates of the couple records 80 to the AVS systems 14. A connect step such as 216 in FIG. 7A may require the first AVS 14A to dial the second AVS 14B using the distributed telephone number of the Anonymous Voice System 14B. In this manner AVS 14B uses the DNIS in step 204 to distinguish customer calls from distributed AVS calls. The first AVS 14A would also send a message to the second AVS 14B identifying the couple for which the dial in call was intended. The disconnect procedure of block 220 would include hanging up the call 903 between AVS 14A and 14B.

The AVSC 320 may also be the interface point for the On-line data system 18. When a connect message is received from the ODS 18, the AVSC 320 identifies the AVS nodes 14A, 14B which will be used to form the anonymous connection. The couple record would be sent to both AVS 14A and AVS 14B. If both parties were dial out, each AVS would dial their party and then the first AVS would initiate a connection with the second AVS. If one party was dial in, then the dial in AVS would wait for the call and notify the second AVS when the call was received. The second AVS would dial the other party, and then establish a connection with the first AVS.

The distributed implementation can also be implemented by replicating the couple database across the AVS systems 14A, 14B. In this case all AVS 14A, 14B maintain the couple database and forward updates to each other. The AVSC 320 continues to serve as the interface to the ODS 18, but it would not be required for anonymous calls using the standalone matchcode approach.

In another embodiment of the distributed architecture, when the AVSC 320 receives a connect message 110 from the ODS 18, it would select an Anonymous Voice System, for example 14A, which is local to one of the callers. The AVSC 320 would send a message back to the ODS 18 which included two phone numbers for AVS 14A. One phone number would be a local number which the local caller would use, the other phone number would be an 800 number for the remote caller to use. The ODS would cause these phone numbers to be displayed on the personal computers 24, 26 of the callers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for creating a voice connection over a circuit switched network between a first party and a second party using an on-line data service to initiate the connection, comprising the steps of:
   a) establishing an electronic communication between the first party and the second party through the on-line data service between a first party and a second party;
   b) requesting a voice communication through the on-line service;
   c) transmitting a message from the online data service to a voice system requesting the voice connection between said first party and said second party;
   c) establishing a first telephone call for the first party;
   d) establishing a second telephone call for the second party; and,
   e) connecting said first telephone call with said second telephone call.

2. The method as recited in claim 1, wherein said telephone call's are established by dialing a telephone station of each party from an anonymous voice system.

3. The method as recited in claim 1, wherein said telephone calls are established by each party dialing an anonymous voice system.

4. The method as recited in claim 1, wherein said anonymous voice communication is requested by selecting a specific anonymous voice communication input provided by a graphical user interface.

5. The method as recited in claim 1, further comprising the steps of providing the parties with a matchcode, entering matchcodes, comparing said entered matchcodes, and connecting the parties if said matchcodes match.

6. The method as recited in claim 1, further comprising the step of storing said matchcode, a first telephone number that corresponds to the first party and a second telephone number that corresponds to the second party.

7. The method as recited in claim 6, further comprising the steps of establishing a third telephone call by the first party, entering said matchcode, establishing a fourth telephone call with the second party and connecting said third telephone call with said fourth telephone call.

8. The method as recited in claim 1, further comprising the step of sending a disconnect message to said online data service when said first telephone call is disconnected from said second telephone call.

9. The method as recited in claim 6, further comprising the steps of recording a message from the first party and playing it to the second party on request.

10. The method as recited in claim 6, further comprising the step of deleting said storage of said matchcode, said first telephone number and said second telephone number.

11. A system that establishes a voice connection over a circuit switched network between a first party and a second party that are both coupled to said circuit switched network, comprising:

a voice system connected to said circuit switched network, said voice system receives a first telephone call from the first party and a second telephone call from the second party, said voice system further receives a matchcode from each party and connects said first telephone call with said second telephone call if said matchcodes match;

said voice system includes an interface to an on-line data service;

said voice system generates a disconnect message for the online data service when said first telephone call is disconnected from said second telephone call.

12. A system for establishing a voice connection over a circuit switched network between a first party and a second party that are both coupled to said circuit switched network, each party also having a data terminal, comprising:

an on-line data service that is coupled to the data terminals of each party, said on-line data service generates a connect command in response to an input provided by a party through the data terminal; and, a voice system connected to said circuit switched network and said on-line data service, said voice system receives said connect command and connects a first telephone call of the first party with a second telephone call of the second party.

13. The system as recited in claim 12, wherein said anonymous voice system dials a telephone station of each party.

14. The system as recited in claim 12, wherein said connect command includes a matchcode and said anonymous voice system connects said first and second telephone calls when the parties enter matching matchcodes.

15. The system as recited in claim 12, wherein said anonymous voice system generates a disconnect command when said first telephone call is disconnected from said second telephone call.

16. The system as recited in claim 15, wherein said disconnect command is sent to said on-line data service.

17. The system as recited in claim 12, wherein said anonymous voice input is provided by a graphical user interface of the data terminal.

18. The system as recited in claim 12, wherein said on-line data service is coupled to the data terminals through a packet switched network.

19. The system as recited in claim 12, wherein said anonymous voice system includes a switch that connects said first telephone call and said second telephone call.

20. The system as recited in claim 19, wherein said anonymous voice system includes a microprocessor and a memory device which store said entered matchcodes, a first telephone number that corresponds to the first party and a second telephone number that corresponds to the second party.

21. The system as recited in claim 20, wherein said anonymous voice system includes a voice processor which generates audio messages that are provided to the parties. system further receives a matchcode from each party and connects said first telephone call with said second telephone call if said matchcodes match.

* * * * *

(12) EX PARTE REEXAMINATION CERTIFICATE (6587th)
United States Patent
DuVal

(10) Number: US 5,818,836 C1
(45) Certificate Issued: Dec. 30, 2008

(54) METHOD AND APPARATUS FOR ANONYMOUS VOICE COMMUNICATION USING AN ONLINE DATA SERVICE

(76) Inventor: Stephen C. DuVal, 186 Plymouth Dr., Iverness, IL (US) 60067

Reexamination Request:
No. 90/007,012, Apr. 23, 2004

Reexamination Certificate for:
Patent No.: 5,818,836
Issued: Oct. 6, 1998
Appl. No.: 08/512,820
Filed: Aug. 9, 1995

(51) Int. Cl.
*H04M 7/00* (2006.01)
*H04M 1/66* (2006.01)
*H04M 3/42* (2006.01)
H04M 15/00 (2006.01)
H04M 7/12 (2006.01)
H04M 3/56 (2006.01)
H04M 3/38 (2006.01)
H04M 3/432 (2006.01)

(52) U.S. Cl. .................. 370/389; 370/352; 370/392; 379/204.01; 379/213.01; 379/88.2

(58) Field of Classification Search .................. None
See application file for complete search history.

(56) References Cited

U.S. PATENT DOCUMENTS

| | | | |
|---|---|---|---|
| 4,741,025 A | | 4/1988 | Maruyama et al. |
| 4,796,293 A | * | 1/1989 | Blinken et al. ......... 379/202.01 |
| 5,099,510 A | | 3/1992 | Blinken, Jr. |
| 5,361,295 A | * | 11/1994 | Solomon et al. ........... 379/67.1 |
| 5,373,549 A | * | 12/1994 | Bales et al. .............. 379/93.21 |
| 5,436,957 A | | 7/1995 | McConnell |
| 5,483,352 A | * | 1/1996 | Fukuyama et al. .......... 358/402 |
| 5,483,588 A | * | 1/1996 | Eaton et al. ............ 379/202.01 |
| 5,539,813 A | | 7/1996 | Jonsson |
| 5,544,237 A | | 8/1996 | Bales |
| 5,555,298 A | | 9/1996 | Jonsson |
| 5,559,875 A | | 9/1996 | Bieselin |
| 5,608,786 A | | 3/1997 | Gordon |
| 5,611,038 A | * | 3/1997 | Shaw et al. ............... 715/500.1 |
| 5,619,555 A | | 4/1997 | Fenton |
| 5,627,978 A | * | 5/1997 | Altom et al. ................ 715/758 |
| 5,644,715 A | | 7/1997 | Baugher |
| 5,689,553 A | | 11/1997 | Ahuja |
| 5,740,549 A | * | 4/1998 | Reilly et al. .................. 705/14 |
| 5,841,763 A | | 11/1998 | Leondires |
| 5,991,394 A | | 11/1999 | Dezonno |
| 6,301,350 B1 | * | 10/2001 | Henningson et al. ... 379/220.01 |

OTHER PUBLICATIONS

Tanenbaum, Andrew S., Computer Networks, 2nd Ed., Prentice–Hall, Inc., ISBN 0–13–162959–X, 1988, pp. 35 and 36.*

* cited by examiner

*Primary Examiner*—Roland G Foster

(57) ABSTRACT

An anonymous telephone communication system. The system includes an anonymous voice system which can establish an anonymous telephone communication through a circuit switched network (CSN). In operation, two parties place separate telephone calls to the anonymous voice system through the CSN. The parties then enter matchcodes through their telephone keypads. The anonymous voice system compares the matchcodes entered by the parties and connects the telephone calls if the matchcodes match. The system may include an on-line data service that establishes electronic communication between the parties through corresponding data terminals. The data terminals may have resident anonymous voice input commands that can be selected by the parties. The on-line data service transmits a connect command to the anonymous voice system which dials the two parties, or waits for the parties to dial the system, and then connects the parties. The anonymous voice system sends a disconnect command to the on-line data service when the parties hang up. The disconnect command can be used by the online service to bill the parties for using the anonymous voice service. The system also stores a couple record during the first anonymous call recording the matchcode and the telephone numbers of both parties. Subsequently, either party may initiate an anonymous call to the other party without prior coordination.

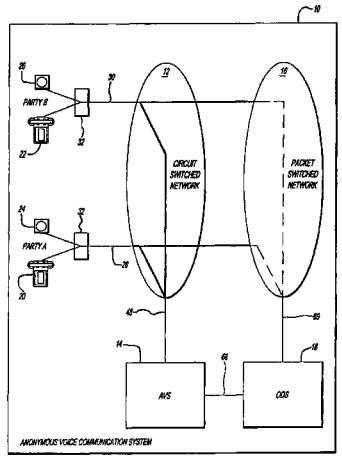

US 5,818,836 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 7, 11, 17, 20 and 21 are cancelled.

Claims 1–3, 5, 6, 8, 12–16, 18 and 19 are determined to be patentable as amended.

Claims 9 and 10, dependent on an amended claim, are determined to be patentable.

New claims 22–30 are added and determined to be patentable.

1. A method for creating a voice connection over a circuit switched network between a first party and a second party using an on-line data service to initiate the connection, comprising the steps of:
  a) establishing an electronic communication between the first party and the second party through the on-line data service between [a] *the* first party and [a] *the* second party, *wherein the first party is anonymous to the second party prior to establishing a first electronic communication between the first party and the second party, wherein the establishing includes providing over the Internet, to a data terminal of the first party coupled to the Internet, information publicly accessible over the Internet, wherein the information publically accessible over the Internet is suitable for presentation within a graphical user interface of the data terminal of the first party, wherein the information publicly accessible over the Internet includes:*
    *(1) first information characterizing the second party,*
    *(2) second information representing a communication from the second party, and*
    *(3) third information specifying a user-selectable element for display within the graphical user interface of the data terminal of the first party, wherein the user-selectable element is visually associated, within the graphical user interface of the data terminal of the first party, with the first information and the second information, when the first information, second information and user-selectable element are presented within the graphical user interface of the data terminal of the first party; and*
  b) *following the establishment of an electronic communication between the first party and the second party through the on-line data service between the first party and the second party, and in response to receiving an indication of selection of the user-selectable element displayed within the graphical user interface of the data terminal of the first party, performing the steps of:*
    (1) requesting a voice communication between the first party and the second party through the on-line *data* service;
    [c)] (2) transmitting a message from the [online] *on-line* data service to a voice system requesting the voice connection between said first party and said second party;
    [c] (3) establishing a first telephone call for the first party;
    [d] (4) establishing a second telephone call for the second party; and,
    [e] (5) connecting said first telephone call with said second telephone call.

2. The method as recited in claim 1, wherein said telephone [call's] *calls* are established by dialing a telephone station of each party from [an anonymous] *the* voice system.

3. The method as recited in claim 1, wherein said telephone calls are established by each party dialing [an anonymous] *the* voice system.

5. The method as recited in claim 1, further comprising the steps of providing the parties with a matchcode, [entering] *receiving entered* matchcodes, comparing said entered matchcodes, and connecting the parties if said matchcodes match.

6. The method as recited in claim [1] *5*, further comprising the step of storing said matchcode, a first telephone number that corresponds to the first party and a second telephone number that corresponds to the second party.

8. The method as recited in claim 1, further comprising the step of sending a disconnect message to said [online] *on-line* data service when said first telephone call is disconnected from said second telephone call.

12. A system for establishing a voice connection over a circuit switched network between a first party and a second party that are both coupled to said circuit switched network, *and the first party is anonymous to the second party prior to establishing a first voice connection between the parties*, each party also having a data terminal, comprising:
  an on-line data [service] *system* that is coupled to the data [terminals] *terminal* of each party, *wherein the on-line data system provides over the Internet, to the data terminal of the first party, information publicly accessible over the Internet, wherein the information publically accessible over the Internet is suitable for presentation within a graphical user interface of the data terminal of the first party, wherein the information publicly accessible over the Internet includes:*
    *(1) first information characterizing the second party,*
    *(2) second information representing a communication from the second party received by the on-line data system from the data terminal of the second party, and*
    *(3) third information specifying a user-selectable element for display within the graphical user interface of the data terminal of the first party, wherein the user-selectable element is visually associated, within the graphical user interface of the data terminal of the first party, with the first information and the second information, when the first information, second information and user-selectable element are presented within the graphical user interface of the data terminal of the first party,*
  *wherein following the provision of the information publicly accessible over the Internet to the data terminal of the first party*, said on-line data [service] *system* generates a connect command in response to an input provided by [a] *the first* party through the data terminal *of the first party indicative of selection of the user-selectable element within the graphical user interface of the data terminal of the first party*; and,
  a voice system connected to said circuit switched network and said on-line data [service] *system, wherein said* voice system receives said connect command and connects a first telephone call of the first party with a second telephone call of the second party *in response to the connect command.*

13. The system as recited in claim 12, wherein said [anonymous] voice system dials a telephone station of each party.

14. The system as recited in claim 12, wherein said connect command includes a matchcode and said [anonymous] voice system connects said first and second telephone calls when the parties enter matching matchcodes.

15. The system as recited in claim 12, wherein said [anonymous] voice system generates a disconnect command when said first telephone call is disconnected from said second telephone call.

16. The system as recited in claim 15, wherein said disconnect command is sent to said on-line data [service] *system* .

18. The system as recited in claim 12, wherein said on-line data [service] *system* is coupled to the data terminals through a packet switched network.

19. The system as recited in claim 12, wherein said [anonymous] voice system includes a switch that connects said first telephone call and said second telephone call.

*22. The method of claim 1, wherein:*

*the user-selectable element comprises an icon; and*

*the step of providing over the Internet, to a data terminal of the first party coupled to the Internet, information publicly accessible over the Internet comprises providing a graphical user interface including said icon.*

*23. The method of claim 22, wherein:*

*the electronic communication includes electronic communication of textual information; and*

*the step of providing over the Internet, to a data terminal of the first party coupled to the Internet, information publicly accessible over the Internet comprises:*

*providing a text presentation portion of the graphical user interface in which textual information is presented; and*

*providing the user-selectable element in association with the text presentation portion of the graphical user interface.*

*24. The method of claim 1, wherein the step of establishing electronic communication comprises establishing textual data communication between the first party and the second party.*

*25. The method of claim 24, wherein the step of establishing textual data communication comprises establishing chat communication between the first party and the second party.*

*26. The method of claim 1, wherein:*

*the step of establishing the first telephone call utilizes a first telephone number associated with the first party;*

*the step of establishing the second telephone call utilizes a second telephone number associated with the second party; and*

*the method further comprises receiving from the data terminal of the first party a request for voice communication including, of the set consisting of the first telephone number and the second telephone number, at most the first telephone number.*

*27. The method of claim 1, wherein the second information comprises an advertisement.*

*28. The system of claim 12, wherein the second information comprises an advertisement.*

*29. The system of claim 12, wherein the user-selectable element comprises an icon.*

*30. The system of claim 12, wherein the on-line data system provides the second information in a text presentation portion of the graphical user interface.*

* * * * *